T. W. Currier,
Extension Stool,
Nº 23,013.  Patented Feb. 22, 1859.
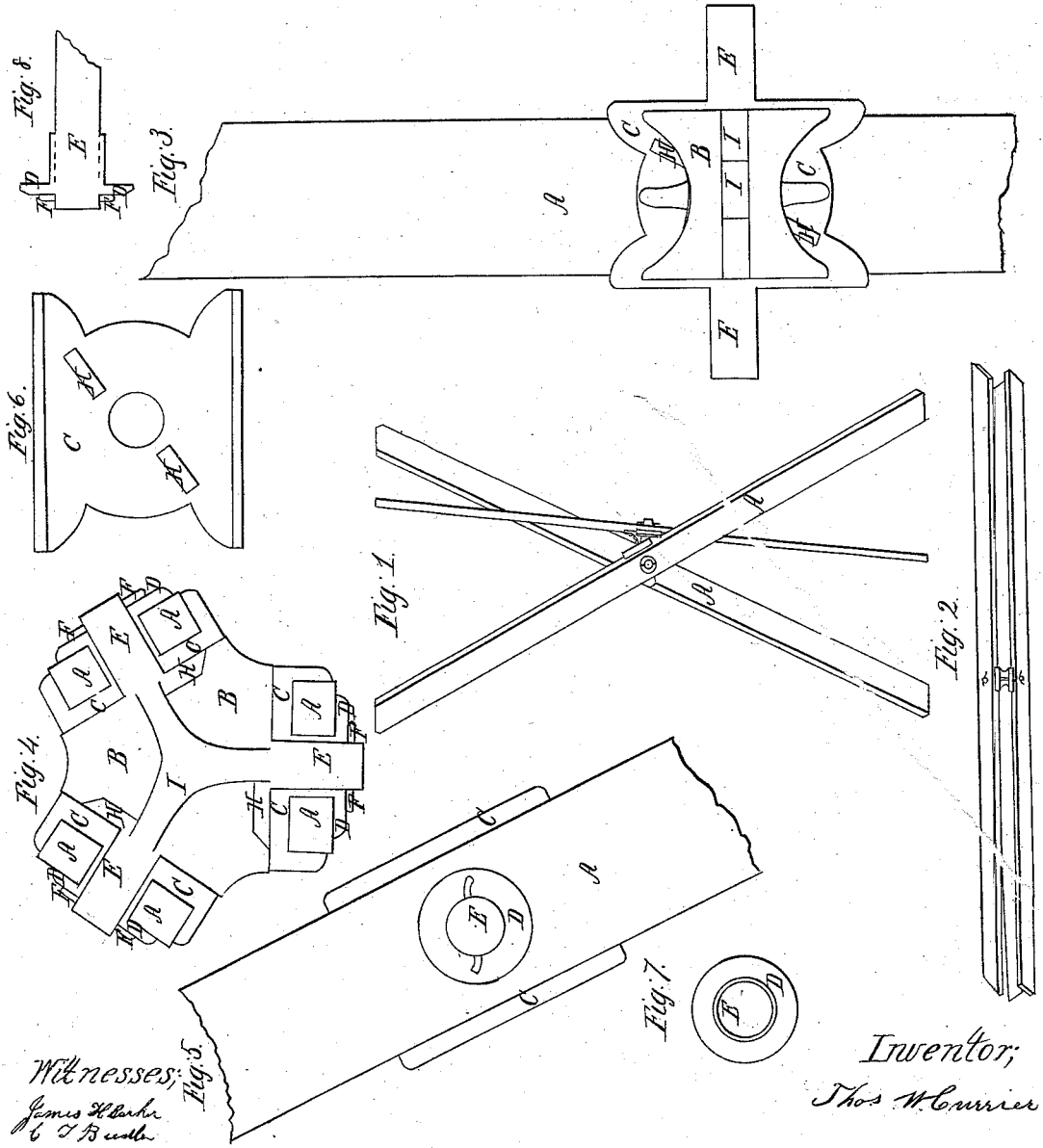
Witnesses:
James H. Barker
C. T. Bustle
Inventor:
Thos. W. Currier

UNITED STATES PATENT OFFICE.

THOMAS W. CURRIER, OF LAWRENCE, MASSACHUSETTS.

TRIANGULAR STAND FOR FURNITURE.

Specification of Letters Patent No. 23,013, dated February 22, 1859.

*To all whom it may concern:*

Be it known that I, THOMAS W. CURRIER, of Lawrence, in the county of Essex and Commonwealth of Massachusetts, have invented a new and useful Extension Triangular Stand; and I do hereby declare that the same is fully described and represented in the following specification and accompanying drawing, of which—

Figure 1 is the stand spread as for use. Fig. 2 is the stand folded. Fig. 3, represents a horizontal view of the triangular flanged plate. Fig. 4 vertical view of the triangular flanged plate. Fig. 5 represents a part of one leg A with plate C washer, D, and pin F as shown in Figs. 6, 7, and 8.

In the drawings, A, represents the legs of the stand and are fixed so as to turn on the axle, E, with the cog, H, attached to the plate, C.

B, represents a triangular plate with flanges, I, on the upper and lower sides so arranged that the cogs, H, will when the stand is spread, abut on one side of the flanges and prevent its opening farther and when shut they will abut against the side of other flanges.

E are the axles on which the legs turn and are a part of the plate, B.

D is a washer with bushing to prevent the axle wearing the legs.

F is a pin to keep the washer in place.

My stand has the advantage of being easily folded up and packed or taken out and spread as circumstances may require.

I claim—

The arrangement of the triangular plates, B, and C, with legs, A, on the axle, E, as, and for the purpose specified.

THOS. W. CURRIER. [L. S.]

Witnesses:
JAMES K. BAKER,
D. L. STOKES.